April 21, 1931.  C. T. EVANS  1,801,598
CONTROLLER FOR ELECTRIC MOTORS
Filed Jan. 18, 1929
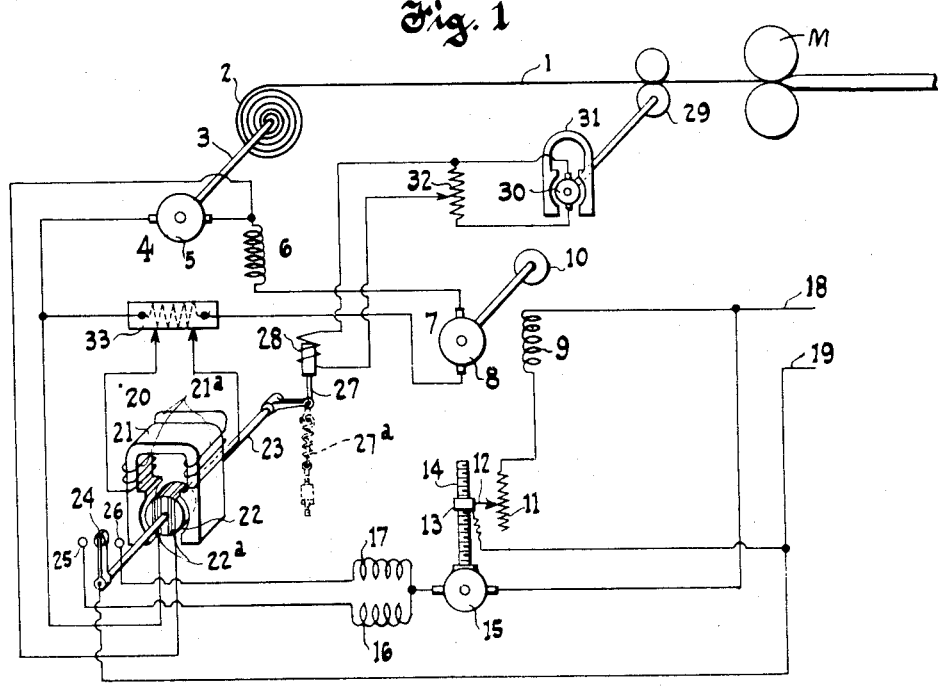
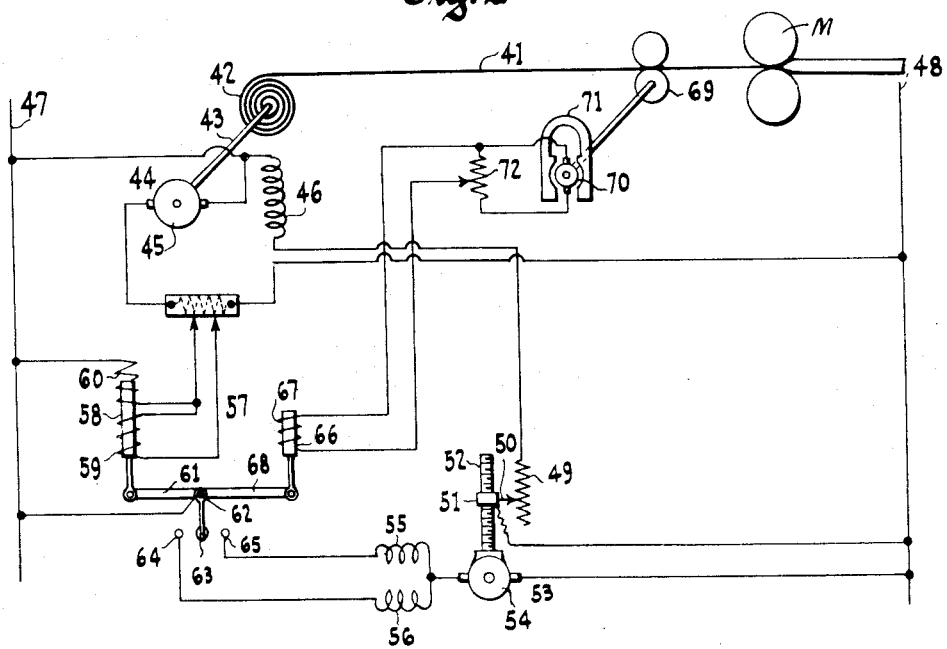
INVENTOR.
Clarence T. Evans.
BY
ATTORNEYS.

Patented Apr. 21, 1931

1,801,598

UNITED STATES PATENT OFFICE

CLARENCE T. EVANS, OF WAUWATOSA, WISCONSIN, ASSIGNOR, BY MESNE ASSIGNMENTS, TO CUTLER-HAMMER, INC., OF MILWAUKEE, WISCONSIN, A CORPORATION OF DELAWARE

CONTROLLER FOR ELECTRIC MOTORS

Application filed January 18, 1929. Serial No. 333,295.

This invention relates to controllers for electric motors which drive machines for coiling strips of metal onto a reel after the strips leave the rolling mill or other machine which gives them their final cross section.

In the rolling of steel strips from ingots or rods it is customary to wind the finished strip or ribbon into a coil after it has passed through the finishing machine. To preserve the quality and finish of the strip after it has passed through the rolling mill, it is necessary that it be wound up at a constant tension. If the coil is wound too loosely, it is difficult of handling in transportation, as it easily falls apart, and if the tension on the strip during winding is too great, the material is stretched and may break or warp.

If the strip is delivered from the finishing rolls at a constant speed, the speed of rotation of the reel should decrease as the diameter of the coil wound thereon increases. On the other hand, if the tension on the strip is to remain constant, the torque of the motor driving the reel must increase with increasing diameter of the coil. In other words for constant strip speed and tension the power input of the motor is constant, irrespective of the type of motor employed and it varies directly with the speed and the tension of the strip.

Where the motor is supplied from a variable voltage source it is therefore necessary to cause it to function irrespective of variations of the source while at the same time the motor speed must also respond to the speed of the strip and must vary in relation thereto.

The object of the present invention is to provide improved apparatus which will control the motor in exact accordance with the load conditions resulting from the change in coil diameter.

Another object is to provide a controller which will control the motor in accordance with a variable voltage impressed upon its armature.

Another object is to provide a controller which will adjust the motor in accordance with the speed with which the strip leaves the rolls.

Another object is to provide a controller which permits of adjustment of the tension on the strip.

Further objects and advantages will appear from the following description and claims but the scope of the invention is not limited to its use in strip winders for metal, and the invention may be applied to other uses where it is desired to regulate the motor speed to correspond to a varying torque as will clearly appear to those skilled in the art.

Figure 1 is a diagrammatic view showing a system embodying my invention and employing a so-called Ward-Leonard variable voltage drive for the strip winder.

Fig. 2 shows a modified system in which a shunt wound motor is employed for driving the reel.

Referring to Fig. 1 the strip 1 issuing from the strip mill M is wound on the reel 2 which is driven through the shaft 3 by the motor 4, the latter having an armature 5 and a series field winding 6. The motor is supplied with energy from a generator 7, having an armature 8 and a separately excited field 9. The generator may be driven by any type of prime mover 10. In series with the field 9 is a field regulating resistance 11, the value of which is varied by means of the sliding contact 12 mounted on the traveling nut 13, which is in an engagement with the screw 14. The screw is driven by the motor 15 which is provided with series field windings 16 and 17 for energizing the motor to revolve in opposite directions, the winding 16 being energized to decrease the resistance 11, and winding 17 being energized to increase the resistance 11. Energy for the motor 15 as well as for the field 9 is supplied from the lines 18 and 19.

Relay 20 is provided with a magnet 21 which is energized by the winding 21ª. The armature 22 is provided with a second winding 22ª. The magnet is so designed that the torque exerted by coils 21ª and 22ª is proportional to the product of current and voltage of the motor 4, and the armature is rotatively mounted on the pivot 23. The armature carries at one end of its shaft a contact 24, which selectively engages stationary contacts 25 and 26. At the other end of its shaft the armature 22 has attached thereto the movable plunger 27 of the electromagnet 28.

The winding 21ª is adjustably connected to the shunt 33 in the armature circuit of the motor 4 so that a given proportion of the armature current can be diverted through the winding 21ª. The winding 22ª is connected across the brushes of the armature 5 of the motor 4, so that its current is proportional to the armature or supply voltage.

The winding 28 is connected to a generator 30, which is driven from a reel or pulley 29 which contacts with the strip 1 so that the voltage of the generator 30 is a direct measure of the speed of the strip. The magnet 28 is so designed that its pull varies proportionally with the impressed voltage. The voltage of the winding 28 can be adjusted relative to the speed of the strip by means of the potentiometer resistance 32, which is connected across the armature 30. Contacts 25 and 26 of relay 20 are connected respectively to the field windings 16 and 17 to thereby energize the motor 15 for reverse directions of rotation. If the strip speed is constant the adjustment of the contacts of the resistance 32 may be omitted and an adjustable spring 27ª which varies the calibration of the relay 20 may be substituted therefor.

Similarly a spring may be substituted for the adjustable resistance 33.

The apparatus functions in the following manner:

Assuming that the motor 4 has been brought up to speed by any suitable means not shown and that the strip 1 has been started on the reel 2. The motor then exerts a pull on the strip and its current and voltage are of such value, that the pull exerted on the armature of the relay 23 by the coils 21ª and 22ª on one hand and the pull exerted by the coil 28 on the other hand just balance, so that no circuit is made between the contacts 24 and 25 or 26 respectively. The motor armature 15 therefore stands still.

If now the diameter of the strip increases, the current of the motor 4 tends to increase. This causes an increase in the current through the coil 21ª and circuit is made between the relay contacts 24 and 26, thereby energizing the motor 15 and causing it to increase the resistance 11 to thereby decrease the field excitation of generator 7 and thus decrease the terminal voltage impressed upon the motor 4. This causes a decrease of the motor current and the relay will return to its neutral position, thereby stopping the motor 15 and preventing further reduction of the field strength of the generator 7.

If the speed of strip 1 should increase, the voltage of the generator 30 will increase correspondingly, thus increasing the current in relay winding 28 and causing the armature of the relay 20 to rotate in a counter clockwise direction, thereby closing circuit between contact 24 and 25 and causing the motor 15 to decrease the field regulating resistance 11. This increases the voltage of the generator 7 and thereby speeds up the motor 4. Increase of the voltage of the generator 7 causes increase of the current in the coils 21ª and 22ª which will bring the armature of relay 20 again back to the neutral position.

If the voltage of the generator 7 decreases the relay 20 makes circuit between contacts 24 and 25, thus causing an increase in the excitation of the generator 7 in the reverse manner from that described until the system is again balanced.

If it is desired to increase the tension on the strip, the sliding contacts connecting the coil 21ª with shunt 33 may be adjusted to permit a smaller or larger percentage of the armature current to pass through the coil 21ª, so as to adjust the balance of the relay 20 for a different current and torque of the motor 4. It is obvious that it is also possible to change the relation between speed and torque by adjustment of the resistance 32.

It is also obvious that the motor 4 may be either of the series type as illustrated, or may have a shunt or separately excited field winding.

The system illustrated in Fig. 2 is in many respects similar to that shown in Fig. 1 except that a shunt wound driving motor is provided for the reel.

In Fig. 2, 41 is the strip which is wound onto the reel 42. The reel is driven through the shaft 43 by the motor 44 having the armature 45 and the shunt field winding 46. The motor is supplied with energy from a source through lines 47 and 48. The field 46 of the motor is connected across the lines 47 and 48 in series with the regulating resistance 49 which may be varied by means of the sliding contact 50 mounted on the traveling nut 51. The nut 51 is moved laterally by means of the screw 52 which is driven by the motor 53 having the armature 54 and the reversing series fields 55 and 56. The motor 53 is controlled, in the manner already described, by means of a relay 57. Said relay has an armature 58 which is energized by a coil 59 adjustably connected across the shunt 59ª in circuit with the armature 45 of the motor 44. A second coil 60 is connected across the supply lines and the arrangement is such that the total pull exerted by the coil 59 and 60 upon the armature 58 is proportional to the product of current and voltage supplied to motor 44.

The armature 58 is attached to the lever 61 which is pivoted at 62. The contact 63 attached to the lever engages contacts 64 and 65 for reverse connections of the motor 53 in the manner already described. The lever 61 has an extension 68 to which is attached the armature 66 which is surrounded by the magnet coil 67. Magnet coil 67 is supplied with energy from the armature 70 of the generator driven by the wheel 69 which is in contact with the strip 41. The generator has the permanent field magnet 71 and the armature is shunted by the adjustable resistance 72.

From the foregoing description of the equipment illustrated in Fig. 1 the operation of the controller illustrated in Fig. 2 will be obvious. If the strip speed increases the voltage of the armature 70 increases which increases the pull on the lever 68 and energizes the motor 53 to increase the resistance 49 and thereby weakening the field 46 of the motor 44. This speeds up the motor thereby causing an increase of the armature current, which will increase the current through the coil 59 and ultimately break the connections between the contacts 63 and 65 respectively. Similarly if the pull on the strip should increase due to increase of the strip coil diameter, the current in the coil 59 will increase, causing contact 63 to engage contact 64 and move sliding contact 50 in the direction to strengthen the field 46. Strengthening of the field causes a decrease of speed of the armature 45 until lever 61 again returns to neutral position.

An increase of the voltage between lines 47 and 48 will increase the output of the motor 44. This will increase the current in the coils 60 and 59, thus causing an increase of the field current 46 through adjustment of the rheostat 49 until the output of the motor is again normal and the relay 57 returns to the neutral position.

What I claim as new and desire to secure by Letters Patent is:

1. The combination with a machine delivering material at a rate which may vary after it leaves said machine, of motor operated gathering means for the material delivered by said machine, and regulating means for said gathering means to maintain a gathering rate equal to the delivery rate for a varying delivery rate and for a varying load or varying voltage of the operating motor of said gathering means.

2. The combination with a machine delivering a ribbon at a rate which may vary after it leaves said machine, of motor operated means for gathering and tensioning the ribbon delivered by said machine and means for regulating the operating motor of said gathering and tensioning means to maintain a constant tension for a varying rate of delivery and for a varying load or varying voltage of the operating motor of said gathering means.

3. The combination with a machine delivering a strip at a rate which may vary after it leaves said machine, of motor operated means for coiling the strip delivered by said machine and applying a tension thereto, and regulating means for the operating motor of the former means to maintain the tension on the strip constant for a varying coil diameter and for a varying rate of delivery, said regulating means comprising means responsive to changes in rate of delivery of the strip at a fixed speed of said machine.

4. The combination with a strip mill, of a winder for coiling the strip delivered by said mill, a motor for driving said winder and control means for said motor to regulate the latter for constant tension on the strip for a varying coil diameter, for varying load or voltage of said motor and for a varying rate of delivery of the strip, said control means including means responsive to changes in rate of delivery of the strip leaving said machine.

5. The combination with a strip mill, of a winder for coiling said strip, a motor for driving said winder and control means for said motor to regulate the latter for constant tension on the strip for a varying coil diameter, for a varying load or voltage of said motor and for a varying rate of delivery of the strip, said control means including means responsive to changes in rate of delivery of the strip leaving said machine and means for varying at will the tension on the strip.

6. The combination with a strip mill, of a winder for coiling said strip, a motor for driving said winder, a generator for supplying said motor, a field regulator for controlling said generator, a relay responsive to the output of said motor for controlling said generator and adapted to maintain said output constant, and means responsive to the speed of said strip after leaving the mill and influencing said relay to vary the output of said motor in accordance with the speed of the strip.

7. The combination with a strip mill, of a winder for coiling said strip, a motor for driving said winder, a generator for supplying said motor, a field regulator for controlling the output of said motor, a relay responsive to the output of said motor and controlling said regulator, and means responsive to the speed of said strip after leaving the mill and influencing said relay to vary its characteristic for varying the output of the motor in accordance with the speed of the strip.

In witness whereof, I have hereunto subscribed my name.

CLARENCE T. EVANS.